UNITED STATES PATENT OFFICE.

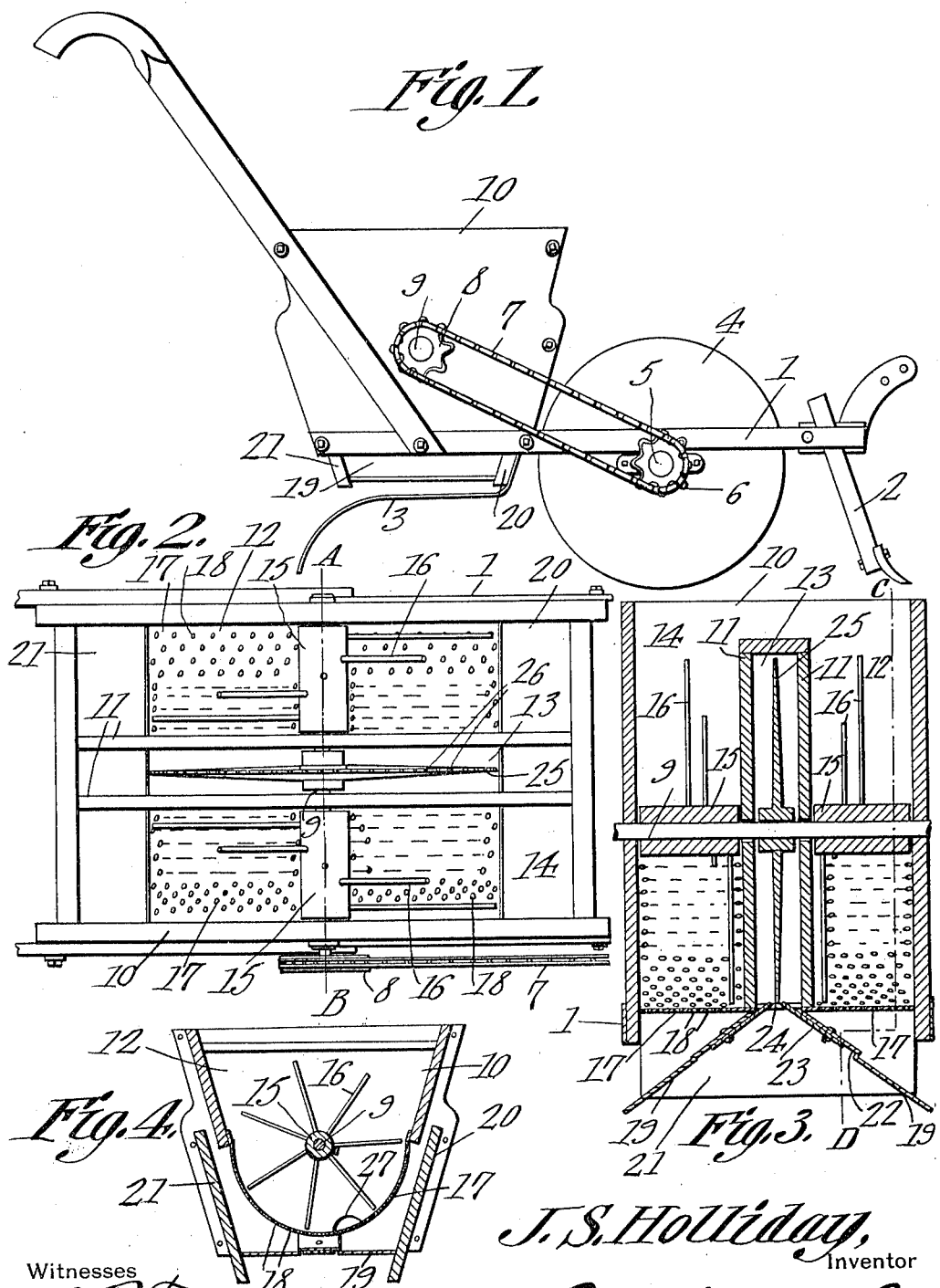

JOSEPH S. HOLLIDAY, OF STATHAM, GEORGIA.

COTTON-SEED SEPARATOR AND PLANTER.

1,079,244.  Specification of Letters Patent.  Patented Nov. 18, 1913.

Application filed June 19, 1913. Serial No. 774,677.

*To all whom it may concern:*

Be it known that I, JOSEPH S. HOLLIDAY, a citizen of the United States, residing at Statham, in the county of Jackson and State of Georgia, have invented a new and useful Cotton-Seed Separator and Planter, of which the following is a specification.

This invention relates to machines for separating and planting cotton seed.

Heretofore the separation of the seeds in order to remove the small faulty seeds from the choice seeds has been effected prior to placing the seeds to be planted in the planter, thus necessitating the expenditure of considerable time and labor depending upon the method employed in effecting the separation.

One of the objects of the present invention is to provide a machine in which all of the seeds, whether choice or faulty can be placed and, as the machine is propelled over the ground, it will not only open a furrow but will separate the small and faulty seeds from the choice seeds, discharge them laterally away from the furrow, and deposit the choice seeds at proper points in the furrow after which said deposited seeds will be covered as ordinarily.

Another object is to provide a machine of this character which is simple in construction, accurate in operation and which is easy to operate.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine. Fig. 2 is a plan view of the hopper and of the parts contained therein. Fig. 3 is a section on line A—B Fig. 2. Fig. 4 is a section on line C—D Fig. 3.

Referring to the figures by characters of reference 1 designates a frame of any suitable construction having a furrow opener 2 connected to the front portion thereof and suitable covering means, 3, connected to the frame back of a furrow wheel 4. This furrow wheel is connected to a shaft 5 journaled on the frame 1 and a sprocket 6 rotates with the shaft and is adapted to transmit motion, through a chain 7 to another sprocket 8 secured to a shaft 9 which is journaled within and extends transversely of a hopper 10 mounted on the rear portion of frame 1. This hopper is divided, by two longitudinal partitions 11, into three compartments 12, 13 and 14 respectively. Shaft 9 extends transversely across all of these compartments and those portions of the shaft within the compartment 12 and 14 are provided with sleeves 15 adapted to rotate with the shaft and provided with radial fingers 16 disposed spirally upon the sleeves. The fingers are arranged with the outermost ones of each series in advance of the next adjoining one so that, when the fingers are rotated, the outermost fingers will direct seeds into the paths of the next adjoining fingers, this operation being continued throughout the length of the series of fingers so that the seeds engaged by the fingers will thus be directed inwardly toward the partitions 11.

The bottom of each compartment 12 and 14 is formed preferably of a bowed sheet 17 of any suitable metal having apertures 18 therein of such size as to permit small and faulty seeds to pass therethrough while preventing the larger seeds from escaping. Arranged under each of these bottom plates 17 is a laterally extending inclined discharge chute 19, these chutes being preferably formed of sheet metal plates extending up to inclined front and back boards 20 and 21 respectively. A portion of each plate 19 has a depression 22 in the bottom thereof in which is arranged a cut-off plate 23, said plate being adjustable longitudinally. The two cut-off plates coöperate with each other to partly or entirely close an outlet opening formed in the bottom of the central compartment 13, as shown at 24. That portion of the shaft 9 extending through compartment 13 has a dropping wheel 25 secured thereto, the periphery of this wheel adapted to extend within the opening formed between the adjustable plates 23. Notches are formed in the periphery of the wheel as shown at 26 and it will be apparent that seeds will become seated in these notches and thus be conveyed by the wheel to the opening 24 which is located at the center of the machine. Small openings 27 are formed in the partitions 11 so as to afford means of